(12) United States Patent
Hsieh et al.

(10) Patent No.: US 7,339,405 B2
(45) Date of Patent: Mar. 4, 2008

(54) CLOCK RATE ADJUSTMENT APPARATUS AND METHOD FOR ADJUSTING CLOCK RATE

(75) Inventors: Bing-Yu Hsieh, Taipei (TW); Hong-Ching Chen, Kao-Hsiung (TW)

(73) Assignee: Mediatek, Inc., Hsin-chu (TW)

( * ) Notice: Subject to any disclaimer, the term of this patent is extended or adjusted under 35 U.S.C. 154(b) by 0 days.

(21) Appl. No.: 11/346,970

(22) Filed: Feb. 2, 2006

(65) Prior Publication Data
US 2007/0176647 A1   Aug. 2, 2007

(51) Int. Cl.
G06F 1/08 (2006.01)
H03K 17/00 (2006.01)

(52) U.S. Cl. .................. 327/99; 327/291; 327/299

(58) Field of Classification Search .............. 327/99, 327/1, 291, 299; 375/289, 354; 386/124, 386/125; 369/47.1, 47.27, 47.28, 47.53, 369/47.55, 53.22, 275.3; 371/40.14; 395/876; 714/769; 713/201; 707/9; 331/11
See application file for complete search history.

(56) References Cited

U.S. PATENT DOCUMENTS

| 4,808,936 A | 2/1989 | Lamb |
| 4,897,559 A | 1/1990 | Yun-Ho |
| 5,001,756 A | 3/1991 | Mayginnes et al. |
| 5,126,691 A | 6/1992 | Mijuskovic et al. |
| 5,389,826 A | 2/1995 | Sonobe |
| 5,804,749 A | 9/1998 | Shirakawa et al. |
| 5,864,568 A * | 1/1999 | Nemazie ............ 714/769 |
| 6,061,418 A | 5/2000 | Hassoun |
| 6,115,836 A | 9/2000 | Churchill et al. |
| 6,154,164 A | 11/2000 | Gross, Jr. |

(Continued)

FOREIGN PATENT DOCUMENTS

JP    2003-296938    * 10/2003

(Continued)

OTHER PUBLICATIONS

Timing and data recovery circuit for high-speed optical storage drives; Luo, Y.-B.; Chiueh, T.-D.; Circuits, Devices and Systems, IEE Proceedings [see also IEE Proceedings G- Circuits, Devices and Systems] vol. 150, Issue 5, Oct. 6, 2003 pp. 379-386 Digital Object Identifier 10.1049/ip-cds:20030220.*

(Continued)

*Primary Examiner*—Tuan T. Lam
*Assistant Examiner*—Diana J Cheng
(74) *Attorney, Agent, or Firm*—Patterson, Thuente, Skaar & Christensen, P.A.

(57) ABSTRACT

A clock rate adjustment apparatus and a method for adjusting a clock rate of a clock for an optical storage system are provided. The clock rate adjustment apparatus comprises an indication provider, a throughput rate detector, and a clock generator. The method performs the following steps. The indication provider generates an indicatory signal indicating a state of the optical storage system. The throughput rate detector generates a control signal in response to the indicatory signal. The clock generator generates the clock at the clock rate in response to the control signal. The clock rate determined by the clock rate adjustment apparatus may be adjusted dynamically in response to a required minimum clock rate and a variable data rate.

20 Claims, 7 Drawing Sheets

U.S. PATENT DOCUMENTS

| | | | |
|---|---|---|---|
| 6,154,165 | A | 11/2000 | Gross, Jr. |
| 6,560,240 | B1 | 5/2003 | Borland et al. |
| 6,583,785 | B2 | 6/2003 | Yeh |
| 6,614,865 | B1 | 9/2003 | Ishimi |
| 6,617,893 | B1 | 9/2003 | Born et al. |
| 6,657,986 | B1 | 12/2003 | Laudel et al. |
| 6,763,478 | B1 | 7/2004 | Bui |
| 6,944,107 | B2 * | 9/2005 | Fukushima et al. ...... 369/47.53 |
| 7,075,375 | B2 * | 7/2006 | Chen et al. .................... 331/11 |
| 2003/0028804 | A1 * | 2/2003 | Noehring et al. ........... 713/201 |
| 2003/0227300 | A1 * | 12/2003 | Miller .......................... 327/99 |
| 2003/0227398 | A1 * | 12/2003 | Chen et al. .................... 341/59 |
| 2004/0179443 | A1 * | 9/2004 | Choo et al. ................. 369/47.1 |
| 2005/0265181 | A1 * | 12/2005 | Yen ......................... 369/47.48 |

FOREIGN PATENT DOCUMENTS

JP    2003296938 A * 10/2003

OTHER PUBLICATIONS

Optics and supercomputing□□Berra, P.B.; Ghafoor, A.; Guizani, M.; Marcinkowski, S.J.; Mitkas, P.A.;Proceedings of the IEEE vol. 77, Issue 12, Dec. 1989 pp. 1797-1815 □□Digital Object Identifier 10.1109/5.48824.*

Buffered and Unattended Dial Unit, IBM Technical Disclosure Bullitin, Apr. 1981, vol. 23, Issue 11, pp. 5023-5024.*

Timing and data recovery circuit for high-speed optical storage drives; Luo, Y, -B.; Chiueh, T.-D.; Circuits, Devices and Systems, IEE proceedings [see also IEE Proceedings G- Circuits, Devices, and Systems] vol. 150, Issue 5, Oct. 6, 2003 pp. 379-386.*

Optics and supercomputing; Berra, P.B.; Ghafoor, A.; Guizani, M.; Marcinkowski, S.J.; Mitkas, P.A.; Proceedings of the IEEE vol. 77, Issue 12, Dec. 1989 pp. 1797-1815.*

Buffered and Unattended Dial Unit, IBM Technical Disclosure Bulletin, Apr. 1981, vol. 23, Issue 11, pp. 5023-5024.*

* cited by examiner

CLOCK RATE ADJUSTMENT APPARATUS AND METHOD FOR ADJUSTING CLOCK RATE

BACKGROUND OF THE INVENTION

1. Field of the Invention

The present invention relates to a clock rate adjustment apparatus and a method for adjusting a clock rate of a clock for an optical storage system; in particular, relates to a clock rate adjustment apparatus and a method adjusting a clock rate according to an indicatory signal retrieved from the optical storage system.

2. Descriptions of the Related Art

Most of electronic systems, such as an optical storage system, need a clock generator to generate some clocks at certain clock rates in order to harmonize or control the operations thereof. Generally speaking, the conventional clock generator may generate a plurality of clocks at different but fixed clock rates. One of the fixed clock rates is selected based on a required operating speed of the electronic systems. Though the conventional clock generator generates clocks at different clock rates to meet the practical needs of the electronic systems, the conventional clock generator still has some drawbacks.

Figure 1:
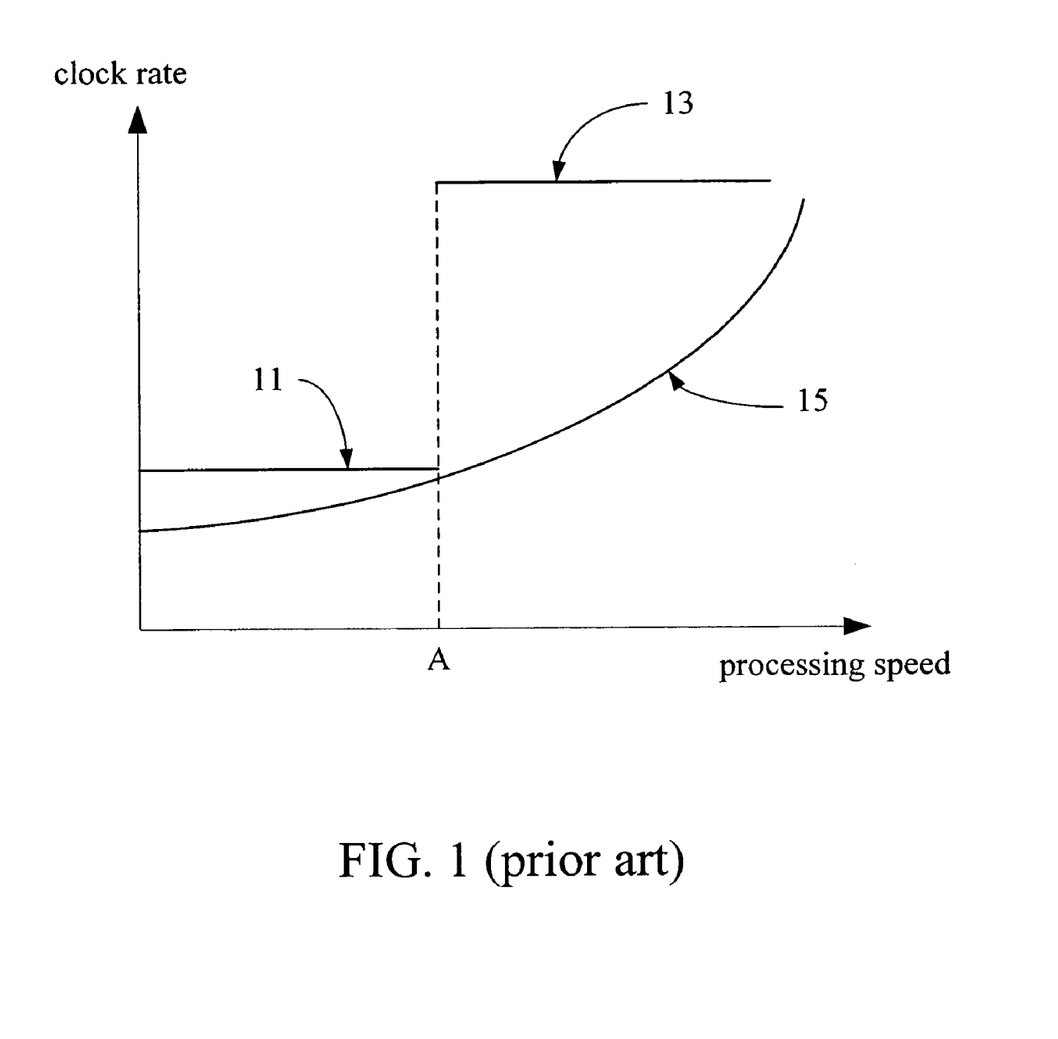
FIG. 1 shows a drawback of a clock generator of the prior art.

FIG. 1 shows one of the drawbacks, wherein the X axis denotes the processing speeds of an electronic system, and the Y axis denotes clock rates. Lines 11 and 13 represent the two fixed clock rates available for the electronic system. A curve 15 represents the required minimum clock rate under different processing speeds. One can easily observe that the higher the processing speed is, the higher a clock rate is required. A first fixed clock rate, i.e., the line 11 is used when the processing speed is slower than point A because the first fixed clock rate is larger than the required minimum clock rate so it is sufficient to maintain the operation of the electronic system. Once the processing speed exceeds point A, a second fixed clock rate, i.e., the line 13 is used instead because the first fixed clock rate is insufficient to maintain the operation but the second fixed clock rate may. When the processing speed is slightly higher than point A, the electronic system is forced to select the second fixed clock rate which is, however, much larger than the required minimum clock rate. Therefore, such few choices of the clock rates cause unnecessary power consumption.

Due to the aforementioned drawback, a new clock rate adjustment apparatus which may dynamically generate a clock rate based on a required minimum clock rate with a feedback circuit to save power is urgently desired.

SUMMARY OF THE INVENTION

An object of this invention is to provide a clock rate adjustment apparatus for adjusting a clock rate of a clock adapted for an optical storage system. The clock rate adjustment apparatus comprises an indication provider, a throughput rate detector, and a clock generator. The indication provider is configured to generate an indicatory signal which indicates a state of the optical storage system. The throughput rate detector is configured to generate a control signal in response to the indicatory signal. The clock generator is configured to generate the clock at the clock rate in response to the control signal. The clock rate generated according to the present invention may be adjusted dynamically in response to a required minimum clock rate by using a feedback control circuit, i.e. the indication provider and the throughput rate detector, of the optical storage system.

Another object of this invention is to provide a method for adjusting a clock rate of a clock for an optical storage system. The method comprises the steps of: generating an indicatory signal from the optical storage system to indicate a state of the optical storage system; generating a control signal in response to the indicatory signal; and generating the clock at the clock rate in response to the control signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
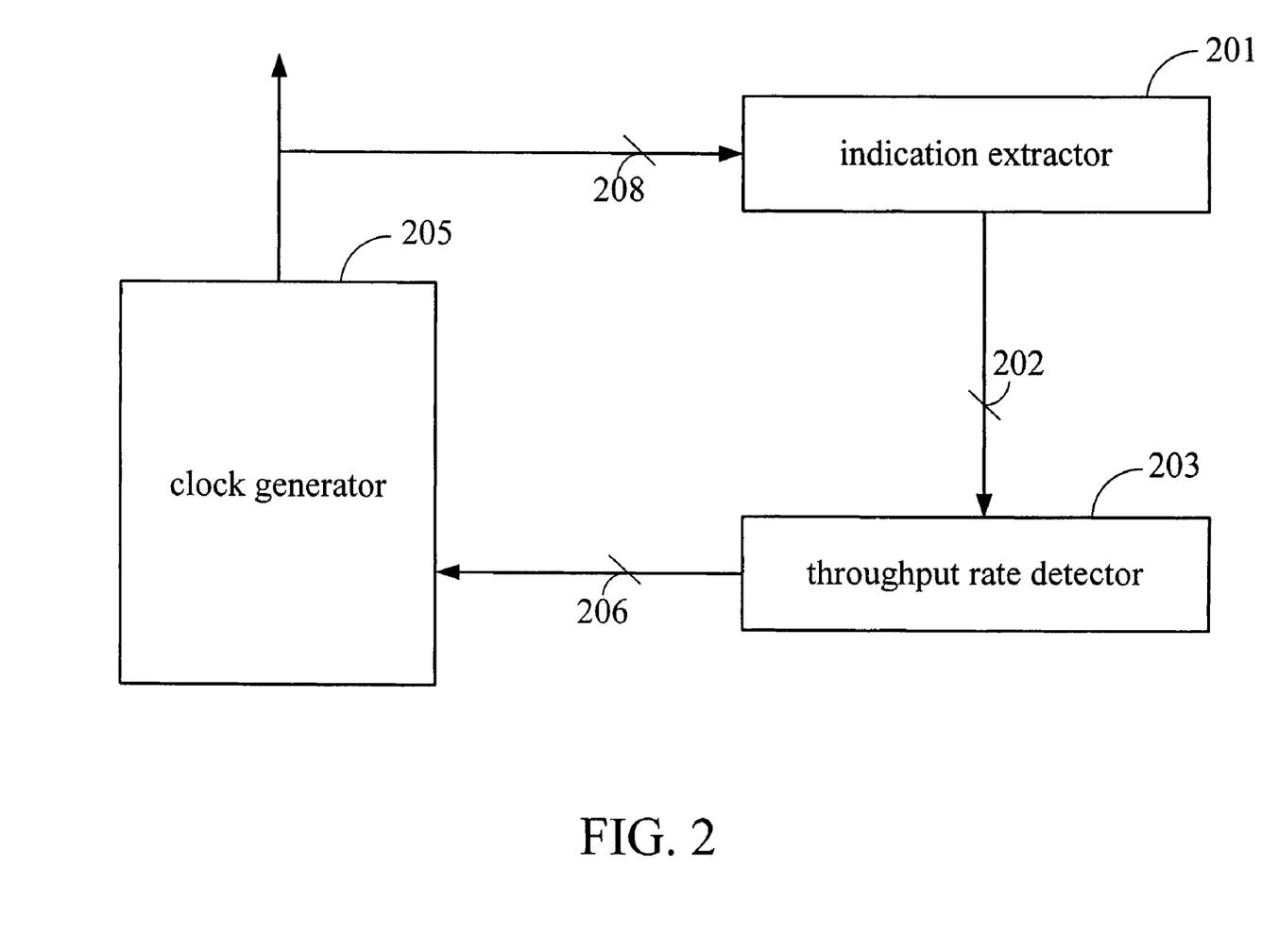
FIG. 2 shows a schematic of an embodiment of the present invention.

One embodiment of the present invention is a clock rate adjustment apparatus for adjusting a clock rate of a clock for an optical disc drive as illustrated in FIG. 2. The clock rate adjustment apparatus 2 comprises an indication provider 201, a throughput rate detector 203, and a clock generator 205. The indication provider 201 is configured to generate an indicatory signal 202 indicating a state of the optical disc drive, wherein the indication provider 201 originally exists in a conventional optical storage system; that is, the embodiment retrieves the indicatory signal 202 which exists in the conventional optical storage system to be a reference. In other words, the indication provider 201 and the indicatory signal 202 are not created to adjust the clock rate in the embodiment. In particular, the state carries the information of an instant required minimum clock rate of the optical disc drive. The throughput rate detector 203 is configured to generate a control signal 206 in response to the indicatory signal 202. The clock generator 205 is configured to generate a clock 208 at the clock rate in response to the control signal 206. The clock 208 is inputted to the indication provider 201 and other clocked elements to control the operations of the optical disc drive.

The optical disc drive comprises a buffer for temporarily storing data being about to be recorded to a disc or for temporarily storing data just retrieved from a disc. One example of the indication provider 201 is a buffer controller which is configured to control access to the buffer of the optical disc drive. The state of the optical disc drive is a buffer busy rate or a buffer idle rate of the buffer. In other words, the buffer busy rate or the buffer idle rate, i.e., the state is retrieved and forms the indicatory signal 202 which is then transmitted to the throughput rate detector 203 by the buffer controller. The throughput rate detector 203 obtains the information of the instant required minimum clock rate by referring to the buffer busy rate or the buffer idle rate and then generates the control signal 206 in response to the indicatory signal 202. The clock generator 205 finally may generate the clock 208 at an appropriate clock rate in response to the control signal 206, i.e., in response to the buffer busy rate or the buffer idle rate. The clock 208 at the appropriate clock rate is outputted to the indication provider 201 and other clocked elements of the optical disc drive to control the operations. For example, if the buffer busy rate increases or the buffer idle rate decreases, this means the buffer gets busier so that the clock rate should be increased to maintain the operations of the optical disc drive.

Another example of the indication provider 201 is a Reed-Solomon engine of the optical disc drive. The state of the optical disc drive is a busy rate, a number of erasures, or a difference between an inner-code parity and an outer-code parity of the Reed-Solomon engine. In other words, the busy rate, the number of erasures, or the difference between the inner-code parity and the outer-code parity, i.e. state is retrieved and forms the indicatory signal 202 which is then transmitted to the throughput rate detector 203. The throughput rate detector 203 obtains the information of the instant required minimum clock rate by referring to the busy rate, the number of erasures, or the difference between the inner-code parity and the outer-code parity and then generates the control signal 206 in response to the indicatory signal 202. The clock generator 205 finally may generate the clock 208 at an appropriate clock rate in response to the control signal 206, i.e., in response to the busy rate, the number of erasures, or the difference between the inner-code parity and the outer-code parity. The clock 208 at the appropriate clock rate is outputted to the indication provider 201 and other clocked elements of the optical disc drive to control the operations. For example, if the busy rate increases, this means the clock should be speeded up to maintain the operations of the optical disc drive. If the number of erasures or the difference between the inner-code parity and the outer-code parity increases, this means errors increase so that the clock should be speeded up to enforce the operating capability of the optical disc drive in order to timely correct the errors.

Another example of the indication provider 201 is a decoder of the optical disc drive. The state of the optical disc drive is an error rate of the decoder. In other words, the error rate, i.e. the state is retrieved and forms the indicatory signal 202 which is then transmitted to the throughput rate detector 203 by the decoder. The throughput rate detector 203 obtains the information of the instant required minimum clock rate by referring to the error rate and then generates the control signal 206 in response to the indicatory signal 202. The clock generator 205 finally may generate the clock 208 at an appropriate clock rate in response to the control signal 206, i.e., in response to the error rate. The clock 208 at the appropriate clock rate is outputted to the indication provider 201 and other clocked elements of the optical disc drive to control the operations. For example, if the error rate increases, this means errors increase during decoding so that the clock rate should be speeded up to enforce the operating capability of the decoder in order to timely correct the errors.

One can easily realize that the indication provider 201 may be an encoder instead of a decoder. In such a case, the state of the optical disc drive is an error rate of the encoder.

Another example of the indication provider 201 is a clocked servo or a buffer of the optical disc drive. The state of the optical disc drive is a spindle speed, a rotation frequency, or a data read speed. In other words, the spindle speed, the rotation frequency, or the data read speed, i.e. the state is retrieved and forms the indicatory signal 202 which is then transmitted to the throughput rate detector 203 by the clocked servo or the buffer. The throughput rate detector 203 obtains the information of the instant required minimum clock rate by referring to the spindle speed, the rotation frequency, or the data read speed and then generates the control signal 206 in response to the indicatory signal 202. The clock generator 205 finally may generate the clock 208 at an appropriate clock rate in response to the control signal 206, i.e., in response to the spindle speed, the rotation frequency, or the data read speed. The clock 208 at the appropriate clock rate is outputted to the indication provider 201 and other clocked elements of the optical disc drive to control the operations. For example, if the spindle speed, the rotation frequency, or the data read speed increases, this means the speed of data retrieval or data recording increases so that the clock should be speeded up to maintain the operations of the optical disc drive.

More specifically, the spindle speed may be one of a constant angular velocity (CAV), a partial CAV, a zone CAV, and a partial constant linear velocity (CLV).

Another example of the indication provider 201 is a host interface of the optical disc drive. The host interface is configured to connect to a host, such as a computer. The state of the optical disc drive is an interface transfer rate of the host interface. In other words, the interface transfer rate, i.e., the state is retrieved and forms the indicatory signal 202 which is then transmitted to the throughput rate detector 203 by the host interface. The throughput rate detector 203 obtains the information of the instant required minimum clock rate by referring to the interface transfer rate and then generates the control signal 206 in response to the indicatory signal 202. The clock generator 205 finally may generate the clock 208 at an appropriate clock rate in response to the control signal 206, i.e., in response to the interface transfer rate. The clock 208 at the appropriate clock rate is outputted to the indication provider 201 and other clocked elements of the optical disc drive to control the operations. For example, if the interface transfer rate increases, this means the speed of transfer increases so that the clock should be speeded up to maintain the operations of the interface transfer.

In addition to the examples of the indication provider 201 recited above, any other element of the optical disc drive which may generate an indicatory signal showing a state of the optical disc drive can be used as the indication provider 201.

Figure 3:
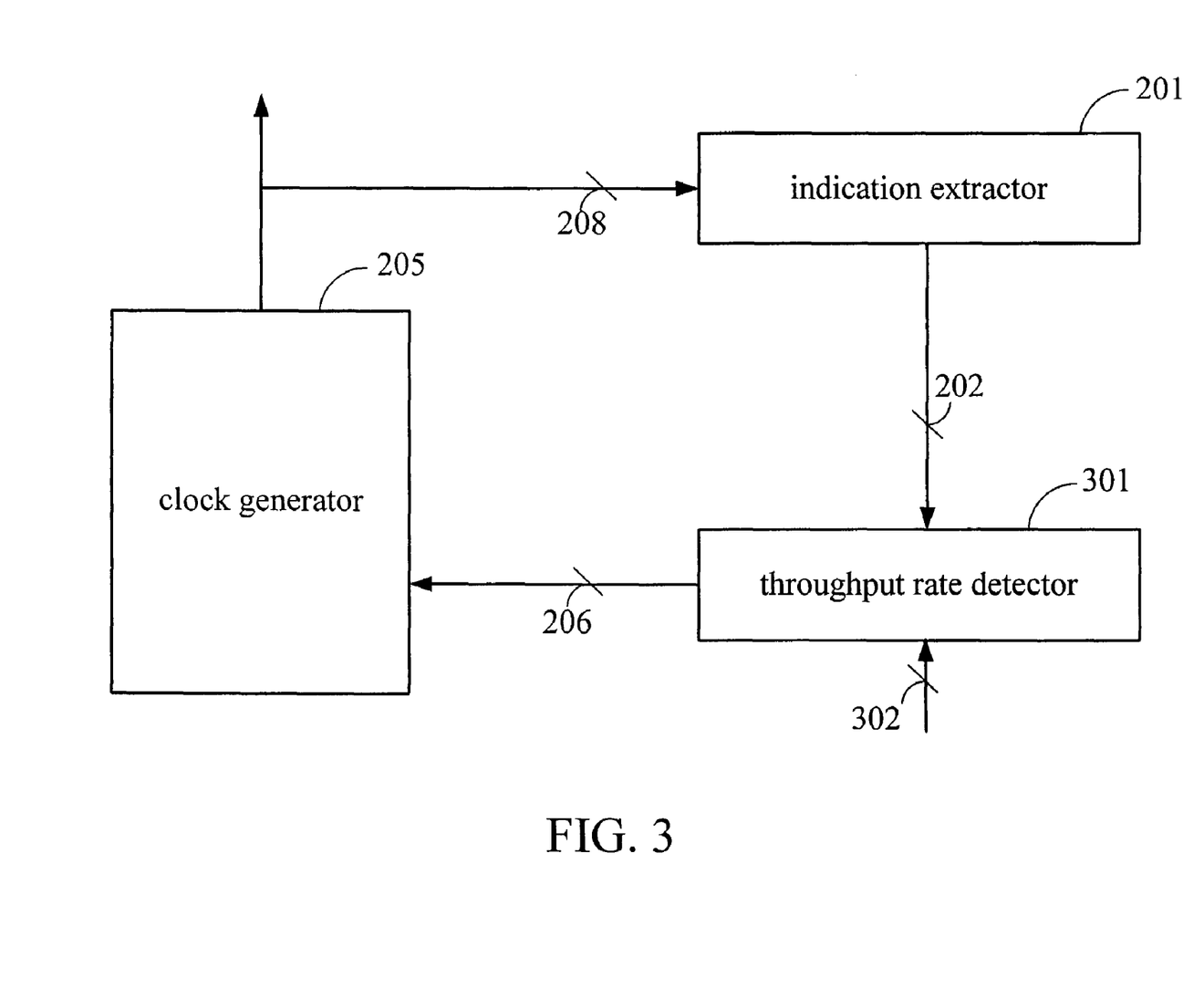
FIG. 3 shows a schematic of another embodiment of the present invention.

Another embodiment of the present invention is shown in FIG. 3, which is also a clock rate adjustment apparatus for adjusting a clock rate of a clock for an optical disc drive. In contrast with the embodiment shown in FIG. 2, the throughput rate detector 301 may further receive a threshold signal 302. The threshold signal 302 is configured to provide a reference to compare with the indicatory signal 202. Rather than simply responding to the indicatory signal 202, the throughput rate detector 301 compares the indicatory signal 202 with the threshold signal 302. The control signal 206 responds to the indicatory signal 202 if the comparison matches a certain condition. For example, if the indication provider 201 is a buffer controller and the state is a buffer busy rate, the control signal 206 will respond to the buffer busy rate when the buffer busy rate is determined larger than the reference after the indicatory signal 202 and the threshold signal 302 are compared. Therefore, a too small buffer busy rate is unable to trigger the clock rate adjustment. More power can be saved thereby.

Furthermore, the indication provider 201 of the two embodiments may have more than one clocked element of the optical disc drive. For example, the indication provider 201 may comprises all examples recited above. The indicatory signal 202 carries all of the corresponding states. The throughput rate detectors 203 and 301 receive all of the corresponding states and determine the instant required minimum clock rate of the whole optical disc drive. The clock generator then generates the clock 208 with an appropriate clock rate which may be used for the whole optical disc drive.

Figure 4:
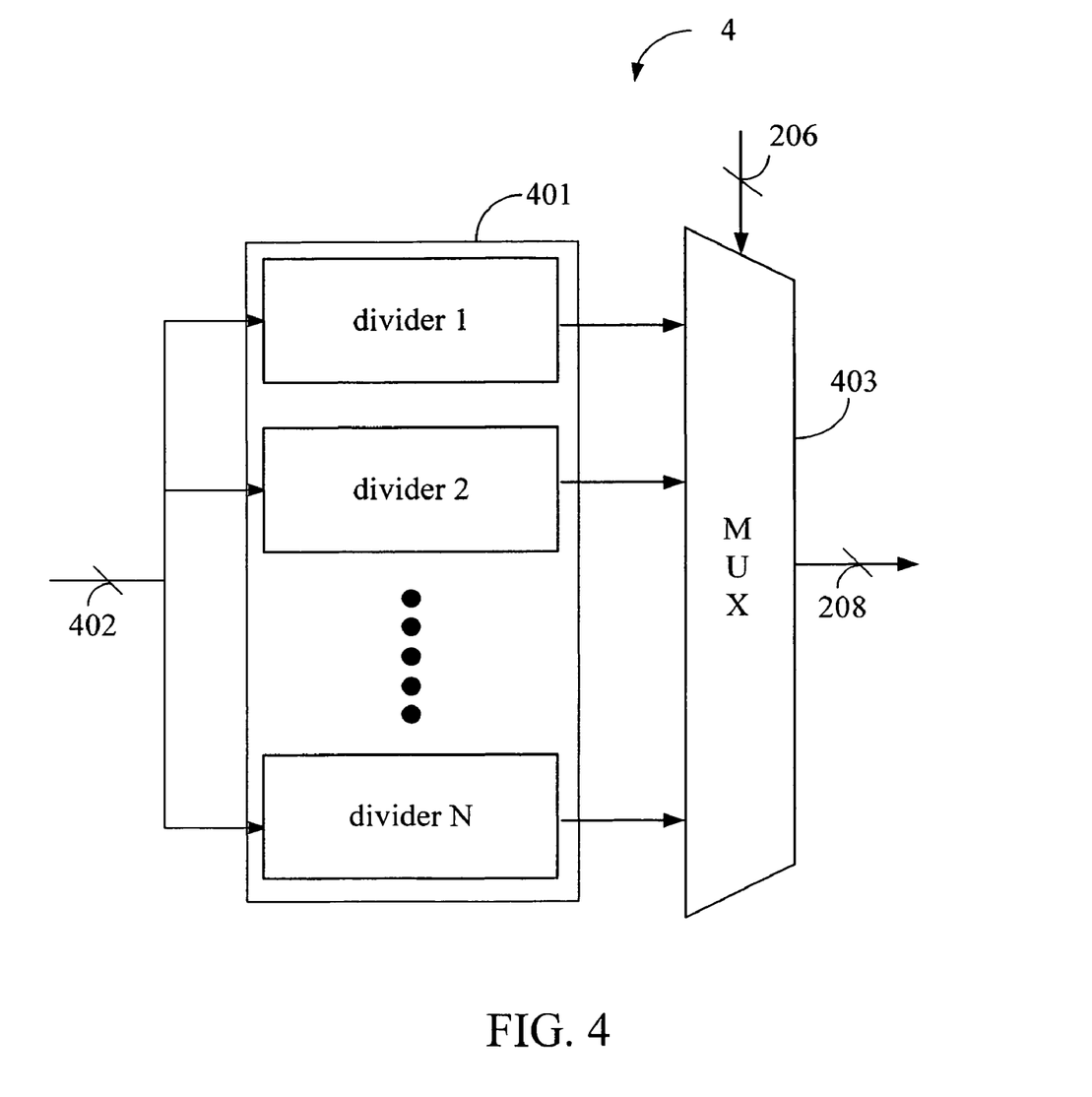
FIG. 4 shows a schematic of an example of a clock generator of the present invention.

One example of the clock generator 205 of the two embodiments comprises a frequency divider shown in FIG. 4. The frequency divider 4 comprises a set of dividers 401 and a multiplexer (MUX) 403. Each divider of the set of dividers 401 is configured to divide an original clock 402, generally generated from a phase locked loop (PLL) circuit, with a particular number so N clocks with different clock rates are generated if the set of dividers 401 comprises N dividers. In response to the control signal 206, the MUX 403 selects a proper divider from the set of the divisors 401. That is, the clock with a particular clock rate generated by the proper divider is outputted from the MUX 403 and forms the clock 208.

Figure 5A:
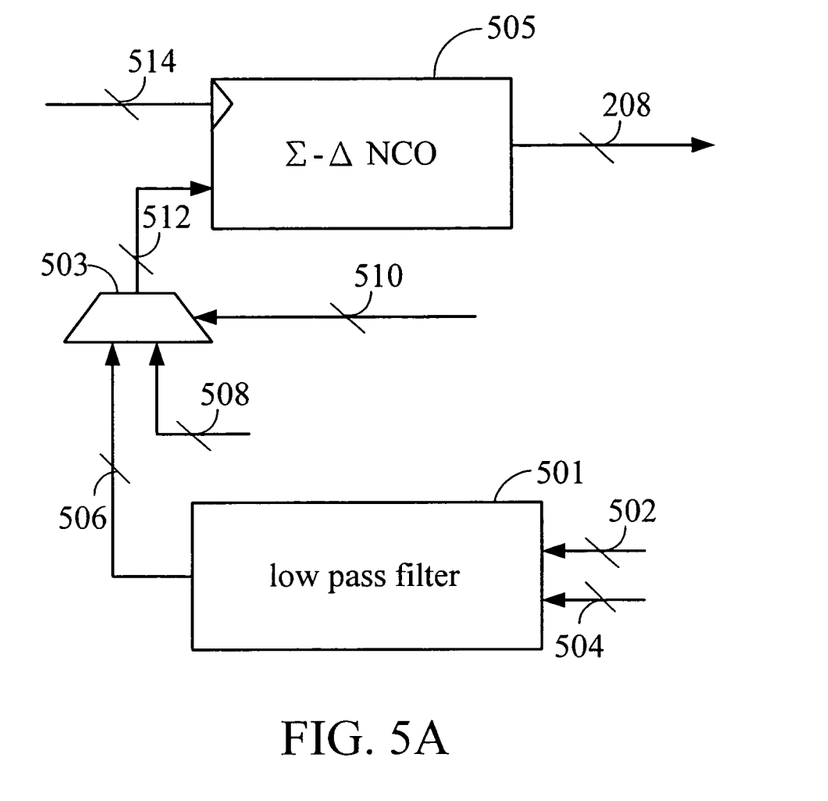
FIG. 5A shows a schematic of another example of the clock generator of the present invention.

Another example of the clock generator 205 of the two embodiments is shown in FIG. 5A, which comprises a low pass filter 501 a MUX 503, and a Σ-Δ number controlled oscillator (NCO) 505. The control signal 206 comprises two signals 502 and 504 to indicate speed up and speed down, respectively. More particularly, the signal 502 is configured to indicate that the optical disc drive requires a larger clock rate and the signal 504 is configured to indicate that the optical disc drive requires a smaller clock rate. The low pass filter 501 receives and accumulates the signals 502 and 504. A signal 506 indicating a result of the accumulation is outputted to the MUX 503. The MUX 503 has two input ends and a control end. One input end receives the signal 506, and the other input end receives a predetermined signal 508 which represents the requirement of a maximum clock rate. When the control end is not triggered by a trigger signal 510 transmitted from a controller or a processor of the optical disc drive, a signal 512 outputted from the MUX 503 is the signal 506. That means the Σ-Δ NCO 505 will operate in response to the signal 506. However, once some emergency occurs so that the maximum clock rate is required immediately, the trigger signal 510 triggers the MUX 503 to output the predetermined signal 508. The Σ-Δ NCO 505 now operates in response to the predetermined signal 508, and the clock 208 is adjusted immediately to have the maximum clock rate thereby.

Figure 5B:
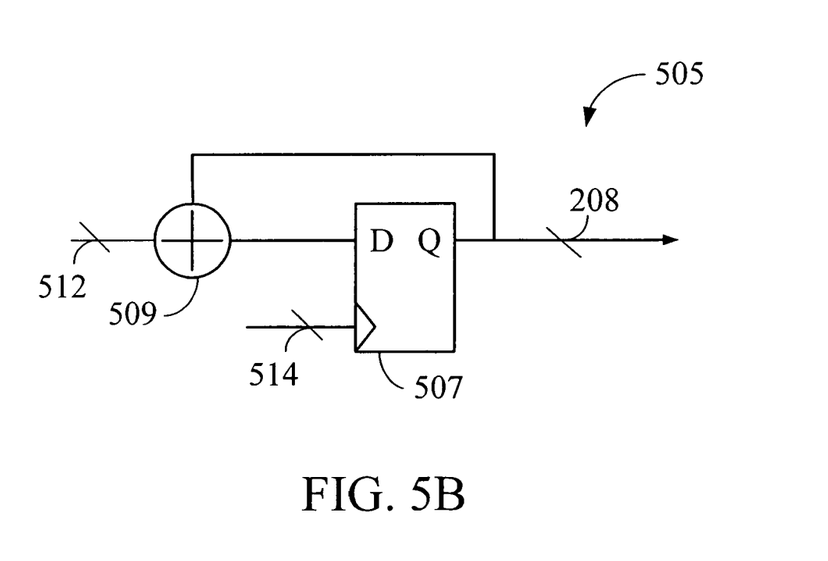
FIG. 5B shows a schematic of a numerical controlled oscillator.

The Σ-Δ NCO 505 has two input ends and an output end. One input end receives an original clock 514 which is identical to the original clock 402, and the other input end receives the signal 512 which decides the clock rate of the clock 208. The Σ-Δ NCO 505, shown in FIG. 5B, comprises a D flip-flop 507 and an accumulator 509. For example, if the frequency of the original clock 514 is 340 MHz and the signal 512 is an eight-bit signal, the clock rate of the clock 208 is derived from the following equation:

$$f_{NCO} = K \times \left(\frac{340\text{MHz}}{256}\right)$$

wherein K denotes the value of the signal 512 and $f_{NCO}$ denotes the clock rate of the clock 208. The clock generator 205 shown in FIGS. 5A and 5B may provide 256 different levels of the clock rate by adjusting K.

Figure 6:
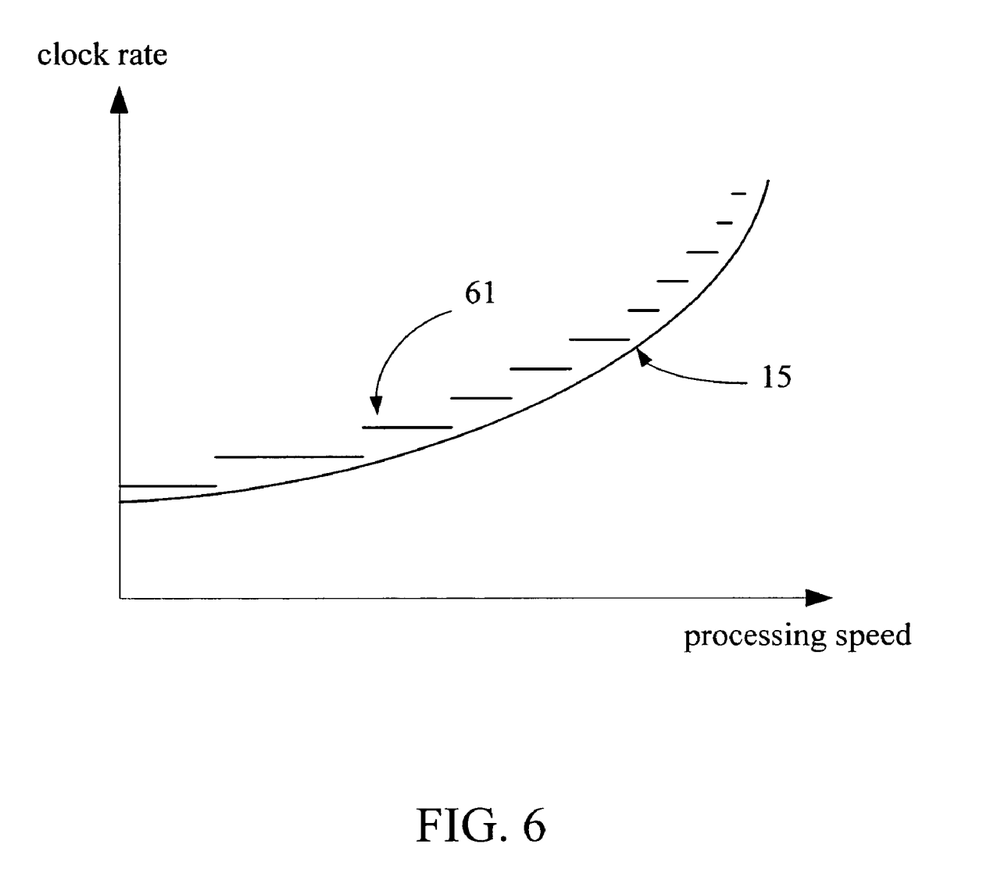
FIG. 6 shows a result of clock rate adjustment performed by a clock rate adjustment apparatus of the present invention.

Referring to FIG. 6, wherein the X axis denotes the processing speeds of the optical disc drive, and the Y axis denotes clock rates. A set of lines 61 represents different levels of the clock rates available for the optical disc drive in accordance with the present invention. A curve 15 represents a required minimum clock rate under different processing speeds. One can easily observe that the set of lines 61 is very close to the curve 15. In conclusion, the clock rate generated according to the present invention may be adjusted dynamically in response to the required minimum clock rate by using the indication provider 201 and the throughput rate detector 203. Therefore, power is saved.

Figure 7:
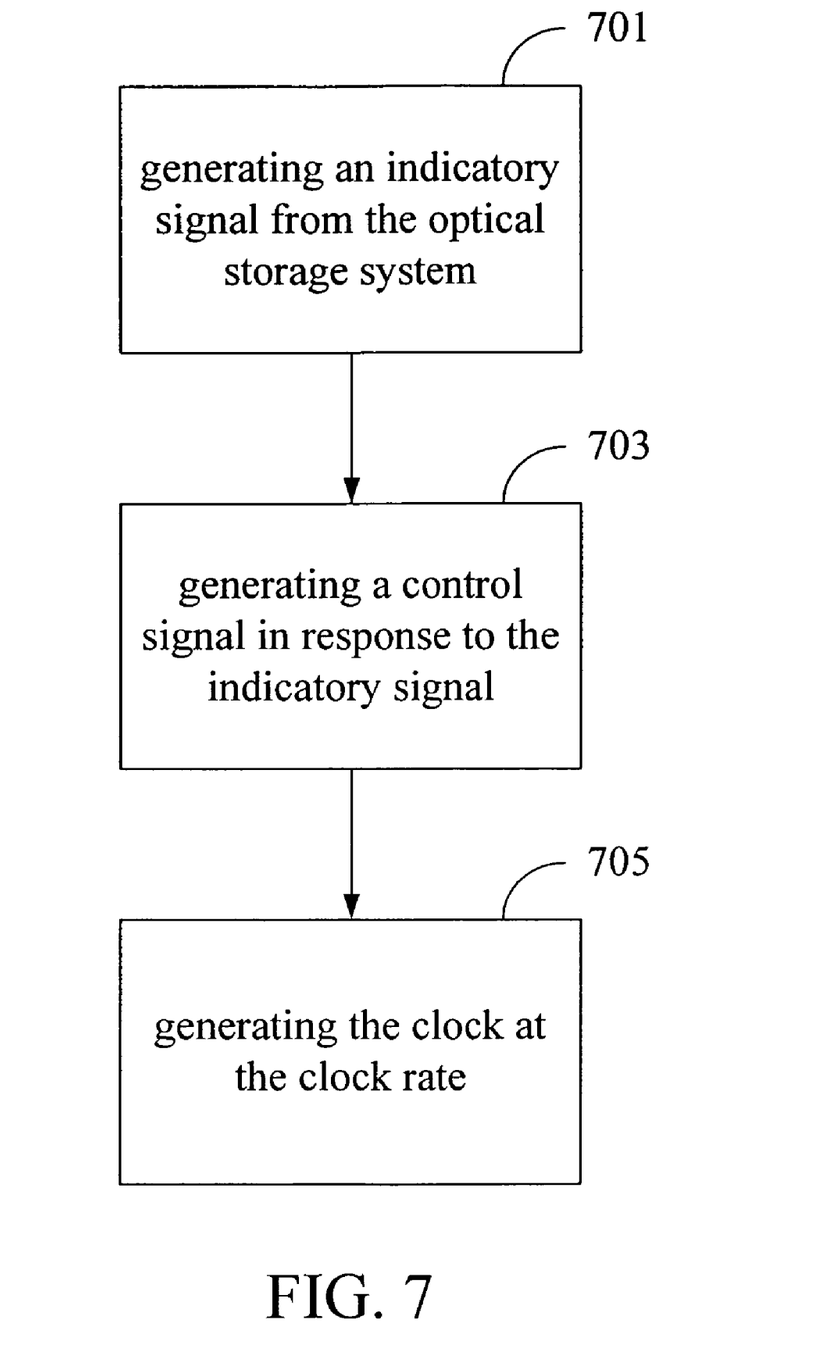
FIG. 7 shows a flow chart of a method for adjusting a clock rate of a clock for an optical storage system.

Another embodiment of the present invention is a method for adjusting a clock rate of a clock for an optical storage system. FIG. 7 shows a flow chart of the method. In step 701, an indicatory signal is generated from the optical storage system to indicate a state of the optical storage system. Then step 703 is executed in which a control signal is generated in response to the indicatory signal. Step 705 is then executed wherein the clock at the clock rate is generated in response to the control signal. The indicatory signal is a signal showing a state of the optical storage system. Similar to the embodiments shown in FIGS. 2 and 3, the optical storage system may comprises a buffer controller, a Reed-Solomon engine, a decoder, a clocked servo, a buffer or a host interface, and the state is one of a buffer busy rate, a buffer idle rate, a busy rate, a number of erasures, a difference between an inner-code parity and an outer-code parity, an error rate, a spindle speed, a rotation frequency, a data read speed, and an interface transfer rate, etc. The spindle speed is one of a constant angular velocity, a partial constant angular velocity, a zone constant angular velocity, and a partial constant linear velocity.

As FIG. 6 already shows, the clock rate generated according to the present invention may be adjusted dynamically in response to the variable data rate by using the indication provider and the throughput rate detector. Therefore, power is saved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A clock rate adjustment apparatus for adjusting a clock rate of a clock for an optical storage system, comprising:
   an indication provider that generates an indicatory signal representing a state of the optical storage system;
   a throughput rate detector that generates a control signal responding to the indicatory signal based on a comparison of the indicatory signal with a threshold signal, wherein the threshold signal is distinct from the clock; and a clock generator that adjusts the clock at the clock rate in response to the control signal.

2. The clock rate adjustment apparatus as claimed in claim 1, wherein the indication provider is a buffer controller for controlling access to a buffer of the optical storage system, and the state is one of a buffer busy rate and a buffer idle rate.

3. The clock rate adjustment apparatus as claimed in claim 1, wherein the indication provider is a Reed-Solomon engine of the optical storage system, and the state is one of a busy rate, a number of erasures, and a difference between an inner-code parity and an outer-code parity.

4. The clock rate adjustment apparatus as claimed in claim 1, wherein the indication provider is a decoder of the optical storage system, and the state is an error rate.

5. The clock rate adjustment apparatus as claimed in claim 1, wherein the indication provider is one of a clocked servo and a buffer of the optical storage system, and the state is one of a spindle speed, a rotation frequency, and a data read speed.

6. The clock rate adjustment apparatus as claimed in claim 5, wherein the spindle speed is one of a constant angular velocity, a partial constant angular velocity, a zone constant angular velocity, and a partial constant linear velocity.

7. The clock rate adjustment apparatus as claimed in claim 1, wherein the indication provider is a host interface of the optical storage system, and the state is an interface transfer rate.

8. The clock rate adjustment apparatus as claimed in claim 1, wherein the clock generator comprises one of a numerical controlled oscillator and a frequency divider.

9. The clock rate adjustment apparatus as claimed in claim 1, wherein the comparison of the indicatory signal with the threshold signal is performed by the throughput rate detector.

10. The clock rate adjustment apparatus as claimed in claim 1, wherein the control signal responding to the indicatory signal is changed to cause a corresponding change in clock rate only when a result of the comparison of the indicatory signal and the threshold signal corresponds to a certain circumstance.

11. A method for adjusting a clock rate of a clock for an optical storage system, comprising:
    generating an indicatory signal from the optical storage system representing a state of the optical storage system, wherein the state is responsive to a potentially variable throughput rate in relation to the clock rate;
    generating a control signal responding to the indicatory signal based on a comparison of the indicatory signal with a threshold signal; and
    generating the clock and adjusting the clock rate in response to the control signal.

12. The method as claimed in claim 11, wherein the optical storage system comprises a buffer controller for controlling access to a buffer of the optical storage system, the indicatory signal is generated from the buffer controller, and the state is one of a buffer busy rate and a buffer idle rate.

13. The method as claimed in claim 11, wherein the optical storage system comprises a Reed-Solomon engine, the indicatory signal is generated from the Reed-Solomon engine, and the state is one of a busy rate, a number of erasures, and a difference between an inner-code parity and an outer-code parity.

14. The method as claimed in claim 11, wherein the optical storage system comprises a decoder, the indicatory signal is generated from the decoder, and the state is an error rate.

15. The method as claimed in claim 11, wherein the optical storage system comprises one of a clocked servo and a buffer of the optical storage system, the indicatory signal is generated from one of the clocked servo and the buffer, and the state is one of a spindle speed, a rotation frequency, and a data read speed.

16. The method as claimed in claim 15, wherein the spindle speed is one of a constant angular velocity, a partial constant angular velocity, a zone constant angular velocity, and a partial constant linear velocity.

17. The method as claimed in claim 11, wherein the optical storage system comprises a host interface, the indicatory signal is generated from the host interface, and the state is an interface transfer rate.

18. The method as claimed in claim 11, wherein the optical storage system comprises one of a numerical controlled oscillator and a frequency divider, and the step of generating the clock at the clock rate is executed by one of the numerical controlled oscillator and the frequency divider.

19. The method as claimed in claim 11, wherein the generating of the control signal responding to the indicatory signal includes changing the control signal to cause a corresponding change in clock rate only when a result of the comparison of the indicatory signal and the threshold signal corresponds to a certain circumstance.

20. A clock rate adjustment circuit for dynamically adjusting a clock rate of a clock for an optical storage system, comprising:
    an indication provider circuit that generates an indicatory signal representing an operational state of the optical storage system, wherein the operational state is responsive to a potentially variable throughput rate in relation to the clock rate;
    a throughput rate detector circuit that performs a comparison of the indicatory signal with a threshold signal to adjust a control signal when a result of the comparison meets a certain condition; and
    a clock generator circuit that adjusts the clock rate in response to the control signal such that the clock rate at least generally corresponds to the throughput rate.

* * * * *